US008619078B2

(12) United States Patent
Mejdrich et al.

(10) Patent No.: US 8,619,078 B2
(45) Date of Patent: Dec. 31, 2013

(54) PARALLELIZED RAY TRACING

(75) Inventors: Eric O. Mejdrich, Mantorville, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 12/784,525

(22) Filed: May 21, 2010

(65) Prior Publication Data

US 2011/0285710 A1 Nov. 24, 2011

(51) Int. Cl.
*G06T 15/50* (2011.01)
*G06T 15/00* (2011.01)
*G06T 15/60* (2006.01)

(52) U.S. Cl.
USPC .......................................... 345/426; 345/419

(58) Field of Classification Search
USPC ....................................................... 345/426
See application file for complete search history.

(56) References Cited

U.S. PATENT DOCUMENTS

| | | | | |
|---|---|---|---|---|
| 5,031,117 | A * | 7/1991 | Minor et al. .................. | 345/606 |
| 6,088,035 | A * | 7/2000 | Sudarsky et al. .............. | 345/421 |
| 6,441,817 | B1 * | 8/2002 | Gossweiler et al. .......... | 345/422 |
| 7,796,835 | B2 * | 9/2010 | Matsumoto .................... | 382/276 |
| 7,808,500 | B2 * | 10/2010 | Shearer .......................... | 345/420 |
| 7,830,379 | B2 * | 11/2010 | Peterson et al. ............... | 345/426 |
| 7,884,819 | B2 * | 2/2011 | Kuesel et al. ................. | 345/426 |
| 8,350,846 | B2 * | 1/2013 | Mejdrich et al. ............... | 345/419 |
| 8,421,801 | B2 * | 4/2013 | Salsbury et al. ............... | 345/426 |
| 2003/0038798 | A1 * | 2/2003 | Besl et al. ...................... | 345/420 |
| 2004/0021768 | A1 * | 2/2004 | Payne et al. ...................... | 348/51 |
| 2004/0125103 | A1 * | 7/2004 | Kaufman et al. .............. | 345/419 |
| 2006/0066607 | A1 * | 3/2006 | Schmittler et al. ............. | 345/419 |
| 2006/0104545 | A1 * | 5/2006 | Matsumoto .................... | 382/302 |
| 2007/0018980 | A1 * | 1/2007 | Berteig et al. ................. | 345/426 |
| 2008/0028403 | A1 * | 1/2008 | Hoover et al. ................. | 718/100 |
| 2008/0049016 | A1 * | 2/2008 | Shearer .......................... | 345/421 |
| 2008/0049017 | A1 * | 2/2008 | Shearer .......................... | 345/421 |
| 2008/0074417 | A1 * | 3/2008 | Mejdrich et al. .............. | 345/420 |
| 2008/0079714 | A1 * | 4/2008 | Shearer .......................... | 345/419 |
| 2008/0122838 | A1 * | 5/2008 | Hoover et al. ................. | 345/420 |
| 2008/0122853 | A1 * | 5/2008 | Brown et al. .................. | 345/522 |
| 2008/0180441 | A1 * | 7/2008 | Brown et al. .................. | 345/427 |
| 2009/0262132 | A1 * | 10/2009 | Peterson et al. ............... | 345/619 |
| 2009/0295805 | A1 * | 12/2009 | Ha et al. ........................ | 345/426 |

(Continued)

OTHER PUBLICATIONS

Marc Levoy and Ross Whitaker, "Gaze-Directed Volume Rendering", Mar. 1990, ACM, SIGGRAPH Computer Graphics, vol. 24, Issue 2, pp. 217-223.*

(Continued)

*Primary Examiner* — Ulka Chauhan
*Assistant Examiner* — Roberta D Prendergast
(74) *Attorney, Agent, or Firm* — Toler Law Group

(57) ABSTRACT

A method includes assigning a priority to a ray data structure of a plurality of ray data structures based on one or more priorities. The ray data structure includes properties of a ray to be traced from an illumination source in a three-dimensional image. The method includes identifying a portion of the three-dimensional image through which the ray passes. The method also includes identifying a slave processing element associated with the portion of the three-dimensional image. The method further includes sending the ray data structure to the slave processing element.

20 Claims, 7 Drawing Sheets

(56) References Cited

U.S. PATENT DOCUMENTS

| | | | |
|---|---|---|---|
| 2010/0073370 A1* | 3/2010 | Mccombe et al. | 345/426 |
| 2010/0188396 A1* | 7/2010 | Mejdrich et al. | 345/419 |
| 2012/0069023 A1* | 3/2012 | Hur et al. | 345/426 |

OTHER PUBLICATIONS

Benthin, C.; Wald, I.; Scherbaum, M.; Friedrich, H.; , "Ray Tracing on the Cell Processor," Interactive Ray Tracing 2006, IEEE Symposium on , vol., No., pp. 15-23, Sep. 18-20, 2006.*

Solomon Boulos, Dave Edwards, J. Dylan Lacewell, Joe Kniss, Jan Kautz, Peter Shirley, and Ingo Wald, 2007, "Packet-based whitted and distribution ray tracing", Proceedings of Graphics Interface 2007 (GI '07), ACM, New York, NY, USA, pp. 177-184.*

Frank Dachille, IX and Arie Kaufman, 2000, "GI-cube: an architecture for volumetric global illumination and rendering", Proceedings of the ACM SIGGRAPH/EUROGRAPHICS workshop on Graphics hardware (HWWS '00), Stephen N. Spencer (Ed.), ACM, New York, NY, USA, pp. 119-128.*

Ize T., Wald I., Parker S. G., "Asynchronous BVH Construction for Ray Tracing Dynamic Scenes on Parallel Multi-Core Architectures", Proceedings of the 2007 Eurographics Symposium on Parallel Graphics and Visualization, May 2007, 8 pages.*

Tony T. Y. Lin , Mel Slater, "Stochastic ray tracing using SIMD processor arrays", The Visual Computer: International Journal of Computer Graphics, vol. 7, No. 4, pp. 187-199, Jul. 1991.*

Toshikazu Ohshima, Hiroyuki Yamamoto, and Hideyuki Tamura, 1996, "Gaze-directed Adaptive Rendering for Interacting with Virtual Space", Proceedings of the 1996 Virtual Reality Annual International Symposium (VRAIS 96), IEEE Computer Society, Washington, DC, USA, 103-111.*

E. O. D. Sevre, M. D. Christiansen, M. Broten, S. M. Wang, and D. A. Yuen, "Experiments in scientific computation on the playstation 3," Visual Geosciences, vol. 13, No. 1, pp. 125-132, Jul. 2008.*

Ingo Wald, Philipp Slusallek, Carsten Benthin, and Markus Wagner, "Interactive rendering with coherent ray tracing", Computer Graphics Forum, vol. 20, No. 3, pp. 153-164, 2001.*

Sven Woop, Jörg Schmittler, Philipp Slusallek, 2005, "RPU: a programmable ray processing unit for realtime ray tracing", ACM Transactions on Graphics, vol. 24, Issue 3, Jul. 2005, pp. 434-444.*

D. Xue, "Volume Visualization using advanced Graphics Hardware Shaders", PhD thesis, The Ohio State University, Department of Computer Science and Engineering, 2008, 143 pages.*

R. Yagel, J. Meeker, "Priority-driven Ray Tracing", The Journal of Visualization and Computer Animation, vol. 8, pp. 17-32, 1997.*

Douglas E. Zongker, Dawn M. Werner, Brian Curless, and David H. Salesin, Aug. 1999, "Environment matting and compositing", Proceedings of the 26th annual conference on Computer graphics and interactive techniques (SIGGRAPH '99), ACM Press/Addison-Wesley Publishing Co., New York, NY, USA, pp. 205-214.*

Thiago Ize; Ingo Wald; and Steven G. Parker, "Asynchronous BVH Construction for Ray Tracing Dynamic Scenes on Parallel Multi-Core Architectures.", Editors: Favre, Jean M., Luis Paulo Dos Santos, and Dirk Reiners, Eurographics Symposium on Parallel Graphics and Visualization (May 2007).*

Hook, David G. "Algorithms for Accelerating Ray Tracing." PhD diss., University of Melbourne, 1995.*

Lauterbach, C.; Yoon, S.-E.; Tuft, D.; Manocha, D.; , "RT-DEFORM: Interactive Ray Tracing of Dynamic Scenes using BVHs," IEEE Symposium on Interactive Ray Tracing 2006, pp. 39-46, Sep. 18-20, 2006.*

Wald, et al., "State of the Art in Ray Tracing Animated Scenes", In State of the Art Reports, Eurographics 2007, Sep. 2007.*

Murphy, Hunter, and Andrew T. Duchowski, "Gaze-contingent level of detail rendering", EuroGraphics 2001, 2001, 10 pages.*

Murphy, Hunter A, "Hybrid Image/Model Based Gaze-Contingent Rendering", PhD diss., Clemson University, Dec. 2007, 85 pages.*

* cited by examiner

PARALLELIZED RAY TRACING

FIELD OF THE DISCLOSURE

The present disclosure relates generally to image processing, and more specifically, to parallelized ray tracing.

BACKGROUND

Ray tracing is a computer-based technique that may be used for creating photorealistic computer graphics in video game animation, motion pictures, and other media applications. In ray tracing, paths ("rays") connecting light sources to objects are identified and summed. Rays may be traced along a line of sight to determine visibility and may be traced from light sources to determine illumination.

A ray may originate at a point in space described by a position vector and travel along a direction vector. Ray tracing may be used to determine whether an object is visible by sending the ray from the origin along a line of sight described by the direction vector. The ray may be tested for intersection with objects within a three-dimensional image to determine whether the object is visible along the line of sight traced by the ray. Ray tracing may generate an image by tracing the ray as it intersects an object in the three-dimensional image. Ray tracing is capable of producing a very high degree of photorealism, usually higher than that of other rendering methods. Ray tracing is capable of simulating a wide variety of optical effects such as reflection and refraction, as well as scattering and chromatic aberration. Scenes created using ray tracing may incorporate data from images or models captured by digital photography.

In ray tracing, a single spatial data structure, such as a tree structure, may be used to represent the image of a particular frame. To avoid having two or more processing elements simultaneously attempt to modify the spatial data structure, ray tracing techniques may be implemented using serial algorithms in which the steps of the algorithm are performed one after another. For this reason, current ray tracing techniques may not be able to take advantage of multiple core processors that can process many steps in parallel.

SUMMARY OF THE DISCLOSURE

In a particular embodiment, a method includes assigning a priority to a ray data structure of a plurality of ray data structures based on one or more priorities. The ray data structure includes properties of a ray to be traced from an illumination source in a three-dimensional image. The method includes identifying a portion of the three-dimensional image through which the ray passes. The method also includes identifying a slave processing element associated with the portion of the three-dimensional image. The method further includes sending the ray data structure to the slave processing element.

In another particular embodiment, a computer program product includes a non-transitory computer usable medium having computer usable program code embodied therewith. The computer usable program code is executable by a processor to receive a ray data structure and a path to a leaf node from a slave processing element at a ray intersection tester. The ray data structure includes properties of a ray to be traced from an illumination source in a three-dimensional image. The properties of the ray include an associated priority. The computer usable program code is further executable by the processor to determine whether the ray intersects a surface in the three-dimensional image. The surface represented by one or more primitive data structures associated with a leaf node. The computer usable program code is further executable by the processor to create a plurality of ray data structures corresponding to a plurality of rays when the ray intersects the surface. The plurality of rays is spawned based on properties of the surface.

In another particular embodiment, a method includes receiving a ray and a path to a leaf node from a slave processing element at a ray intersection tester. The method includes determining whether the ray intersects one or more primitive data structures associated with the leaf node. The method also includes spawning a plurality of rays when the ray intersects the one or more primitive data structures based on properties of the one or more primitive data structures.

In another particular embodiment, a master processing element is operable to receive one or more priorities associated with a plurality of rays. The master processing element is operable to assign a priority to a ray data structure based on the one or more priorities. The ray data structure includes properties of a ray from the plurality of rays that is to be traced from an illumination source in a three-dimensional image. The master processing element is further operable to identify a portion of a three-dimensional image through which the ray passes. The master processing element is operable to identify a slave processing element associated with the portion of the three-dimensional image. The master processing element is further operable to send the ray data structure to the slave processing element.

These and other advantages and features that characterize embodiments of the disclosure are set forth in the claims annexed hereto and forming a further part hereof. However, for a better understanding of the disclosure, and of the advantages and objectives attained through its use, reference should be made to the drawings and to the accompanying descriptive matter in which there are described exemplary embodiments of the disclosure.

DETAILED DESCRIPTION

Figure 1:
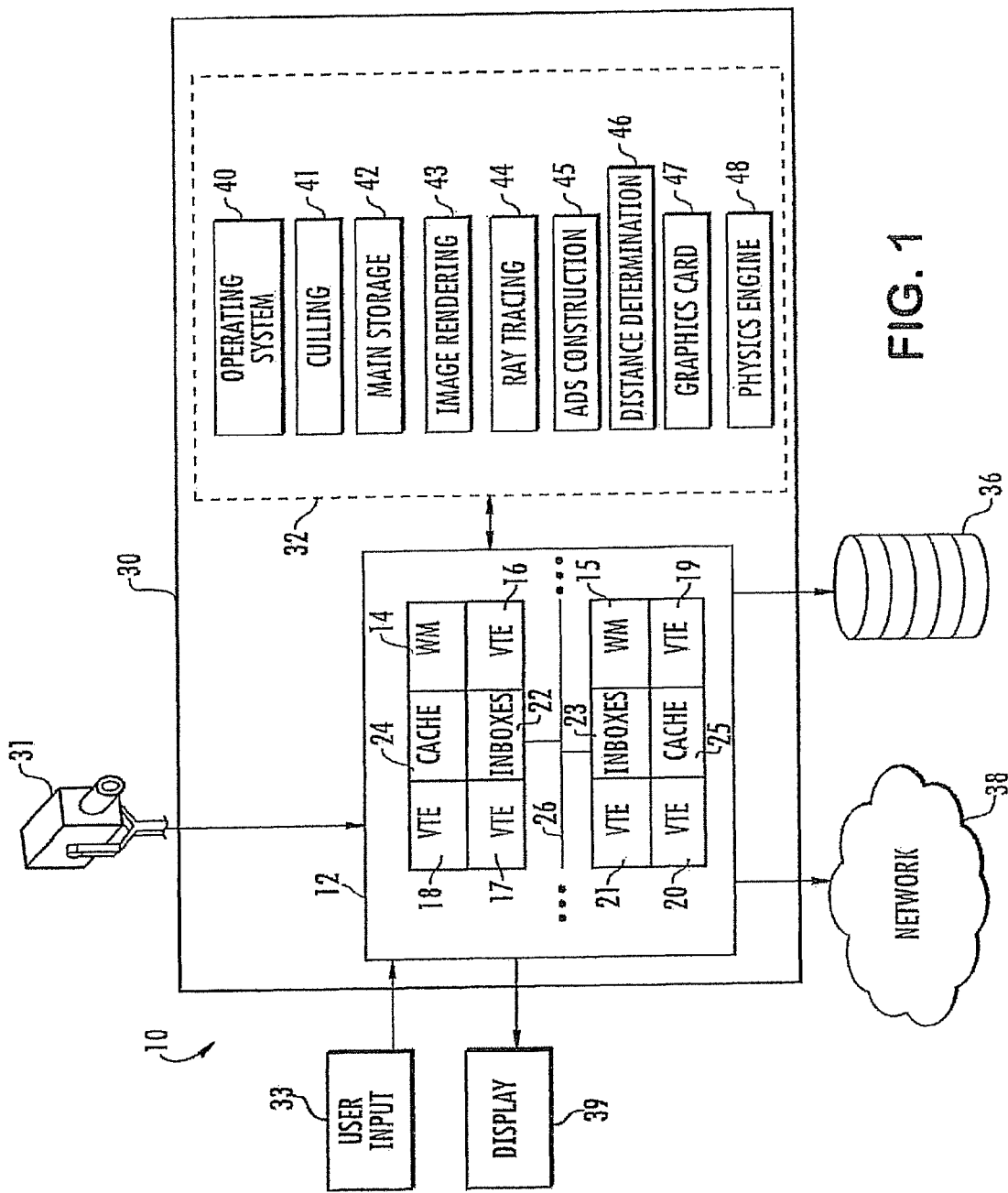
FIG. 1 is a first block diagram of a system to construct a spatial data structure.

Ray tracing describes a technique for synthesizing photorealistic images by identifying and summing paths ("rays") that connect light sources to a camera. In ray tracing, rays may be traced along a line of sight to determine visibility and may be traced from light sources to determine illumination. A ray may originate at a point in space described by a position vector and may travel along a direction vector. In ray tracing, to determine visibility, the ray may be sent from the origin along a line of sight described by the direction vector. The ray may be tested for intersection against objects within a three-dimensional image to determine the nearest visible object along that line of sight. Ray tracing may generate an image by tracing the ray through individual pixels of the objects in the three-dimensional image.

Scenes in ray tracing may be represented mathematically using a spatial data structure that represents a three-dimensional image. For example, a k-dimensional tree (kd-tree), a type of binary tree, may be used as a spatial data structure to represent a three-dimensional image. The spatial data structure may be referred to as an accelerated data structure (ADS), because the spatial data structure can be built and traversed relatively quickly.

When rendering a three-dimensional image, a graphics generation system may initially create a spatial data structure that corresponds to the three-dimensional image. The spatial data structure may be created by recursively subdividing the three-dimensional image into smaller portions (e.g., cubes), called bounding volumes. The graphics generation system may add nodes to the spatial data structure based on the bounding volumes of the three-dimensional image. For example, one or more nodes of the spatial data structure may correspond to particular bounding volumes of the three-dimensional image. To represent objects located in the three-dimensional image, the graphics generation system may use geometric primitives as building blocks for depicting the objects. The graphics generation system may add geometric data structures that represent the geometrics primitives to the spatial data structure. The graphics system may use ray data structures that represent rays of light providing illumination in the three-dimensional image to model how the rays illuminate the objects in the three-dimensional image. The graphics generation system may trace a path of each ray to determine whether the ray intersects any of the primitives in the three-dimensional image by using the ray data structure (that represents the ray) and the spatial data structure that includes the primitive data structures (that represent the primitives of the objects). In a particular embodiment, a kd-tree may be used to represent the three-dimensional image.

When a kd-tree is used to represent a three-dimensional image, the kd-tree may include three types of nodes, internal nodes, empty leaf nodes, and full leaf nodes. Each node may represent a portion of the three-dimensional image, called a bounding volume. For example, the bounding volume may be specified using two opposing corners of a cube and a length of each side of the cube. The three-dimensional image may be divided into many bounding volumes, with each bounding volume having a corresponding node in the spatial data structure.

Internal nodes may represent a subdivided portion of the three-dimensional image. Empty leaf nodes may represent empty portions of the three-dimensional image, i.e. portions of the three-dimensional image that do not contain any representations of objects. Empty leaf nodes may contain information on a background to display, e.g., a blue sky. Full leaf nodes may represent portions of the three-dimensional image that include objects. Each object in the three-dimensional image may be rendered using geometric primitives, such as triangles. The geometric primitives may be used to describe objects that occupy portions of the three-dimensional image. Each full leaf node may include data structures associated with the geometric primitives ("primitive data structures") that depict an object in a portion of the three-dimensional image.

A ray tracing algorithm may recursively divide the three-dimensional image into bounding volumes. Initially, the three-dimensional image may be split into two portions. Each resultant half portion may be further split into additional portions. The kd-tree is a hierarchical structure, with each branch representing a further splitting of the three-dimensional image. For example, four nodes at a particular level in the kd-tree may represent four portions, i.e. bounding volumes, of the three-dimensional image. A leaf node of the kd-tree may be empty when no object is present in the space represented by the leaf node, i.e., the space represented by the leaf node is empty or includes only a representation of a background (e.g., a sky) in the three-dimensional image. When an object is present in the space represented by a leaf node, the leaf node may include data ("primitive data structure") identifying the primitives that are used to depict the object. A primitive is a geometric shape, that when combined with other primitives, may be used to depict an object in a three-dimensional image. The primitive may be a triangle, a cube, a cylinder, another geometric shape, or any combination thereof. Each leaf node may be branched off from an internal node that is at a higher level in the kd-tree. Thus, a particular node may have leaf nodes that represent further divisions of the space associated with the particular node.

At any given level of the kd-tree, a data representation of the ray may be evaluated against the nodes (i.e., bounding volumes) to determine whether the ray misses, hits, refracts and/or reflects from an object. Rays may be tested for intersection with portions of the objects in the three-dimensional image by testing the corresponding ray data structures for intersection with leaf nodes of the spatial data structure. For example, the kd-tree may be traversed using a ray data structure representation of the ray to determine whether the ray intersects any of the portions of the three-dimensional image that are represented by the leaf nodes of the kd-tree. The traversal may start at a top node and recursively search nodes that branch off from the top node. Once a leaf node that corresponds to a portion of the object that is intersected by the ray has been identified, an algorithm may examine the properties of the primitive data structures in the leaf node that represent the intersected object to calculate the final color of the pixels used to render the intersected object.

The tree structure may be recalculated and rebuilt for every frame of an animated movie or game to allow frame-to-frame optimization of leaf nodes. How many primitive data structures occupy each leaf node may be based on a spatial distance from a reference point. For example, the number of primitive data structures that occupy a particular leaf node may be based upon the particular leaf node's distance from the center of a view frustum. A view frustum is a region of space from a three-dimensional image that may be viewed on a screen, i.e., a field of view of a notional camera. Primitive data structures that represent primitives may be inserted into leaf nodes of the kd-tree based upon whether the primitives lie within the view frustum of the three-dimensional image or whether the primitives are only needed for reflected rays and shadows.

Referring to FIG. 1, a first block diagram of a system to construct a spatial data structure is depicted and generally designated 10. The system 10 includes a computer 30 coupled to a network 38. The network 38 may include a local area network, a wide area network, a wireless network, a public network (e.g., the Internet), another type of network, or any combination thereof. Additional computers and devices (e.g., servers) may be networked through the network 38. The system 10 may also be referred to as an "apparatus," "computer," "tool," "device," or just "system," although it should be appreciated that the terms may respectively include many other configurations. Moreover, while only one network interface device is shown in FIG. 1, additional computers and devices may be networked through the network 38. In a particular embodiment, the system 10 may be implemented as a standalone configuration, i.e., disconnected from another computer or computer network.

The computer 30 may include at least one processor 12 coupled to a memory 32. The processor 12 may represent one or more processors (e.g., central processing units, microprocessors). The processor 12 of FIG. 1 may include a multiple core processing element. The memory 32 may include static random access memory (SRAM) devices, the main storage 42 of the computer 30, and supplemental levels of non-transitory memory, e.g., cache memories, non-volatile or backup memories (e.g., programmable or flash memories), read-only memories, etc. In addition, the memory 32 may include non-transitory memory storage physically located elsewhere in the computer 30, e.g., a cache memory present in the processor 12 and a storage device used as a virtual memory.

The computer 30 may include input interfaces and output interfaces for communicating information to and from the computer 30. To enable a user to interact with the computer 30, the computer 30 may include one or more input devices 33 (e.g., a keyboard, a mouse, a trackball, a joystick, a touch pad, iris/fingerprint scanner, and/or a microphone, among others). The computer 30 may also include a display device 39 (e.g., a CRT monitor, an LCD display panel, and/or a speaker). In a particular embodiment of the computer 30, direct user input and output may be unsupported by the computer 30 (e.g., the computer 30 may be a server). In this embodiment, the computer 30 may be accessed via another computer or workstation networked to the computer 30.

As shown in FIG. 1, the system 10 includes a camera 31 that may be used to capture images generated by a ray tracing operation. For additional storage, the system 10 may also include one or more mass storage devices 36 configured to store, for instance, film, animation or other image data. The mass storage devices 36 may include a floppy, a removable disk drive, a flash drive, a hard disk drive, a direct access storage device (DASD), an optical drive (e.g., a CD drive, a DVD drive, etc.), a tape drive, another type of storage device, or any combination thereof.

Furthermore, the computer 30 may include an interface with one or more networks (e.g., a LAN, a WAN, a wireless network, and/or the Internet, among others) to enable the communication of information with other computers coupled to the network 38. The computer 30 may also include suitable analog and/or digital interfaces between the processor 12 and each of the components of the system 10.

The computer 30 may operate under the control of an operating system 40. The computer 30 may execute various computer software and hardware applications, components, programs, and modules. In FIG. 1, the system 10 may include a culling algorithm 41, a main memory storage 42, an image rendering algorithm 43, a ray tracing program 44, an accelerated data structure (ADS) construction algorithm 45, a distance determination program 46, a graphics card program code 47, and a physics engine 48. The image rendering program 43 may be used to create an image at the display device 39 and may affect variables such as shadow quality, depth of recursion and sampling rates. The ray tracing program 44 may assist in image generation by tracing paths of light through pixels in a three-dimensional image. The graphics card program code 47 may be executed by a video card, also known as a graphics accelerator card, display adapter, or graphics card, and may be used to generate and output images to the display device 39.

The ADS construction algorithm 45 may be used to generate a spatial index used by the image rendering algorithm 43, the ray tracing programs 44, or both. The spatial index may be a grid index, a z-order index, a quadtree index, an Octree index, a Visual Basic (VB) tree index, an R-tree index, a kd-tree index, another spatial index, or any combination thereof. Spatial indexes may be used by spatial databases to optimize spatial queries, such as how far two points differ and whether points fall within a spatial area of interest.

The distance determination program 46 may determine a distance between a reference point (e.g., a point of origin of a ray) and a bounding volume. The distance determination program 46 may determine a distance between a reference point and a primitive.

The physics engine 48 may be an application that simulates real world physical phenomena as applied to objects within a three-dimensional image. The physics engine 48 may be used to simulate and predict the effects of physical phenomena on a frame-to-frame basis. For example, the physics engine 48 may perform position updates for an object when the object is moving, and may perform collision detection tests to determine whether an object collides with any other objects within the three-dimensional image. In a particular embodiment, the physics engine 48 may use multiple processing elements on a multiple core network on a chip (NOC) to perform physics-related calculations.

The processor 12 may be a multiple core processing element that includes basic throughput engines (BTEs). Each BTE may include a processing element (e.g., a processing core) and a core cache, such as a Level 1 (L1) cache. As shown in FIG. 1, the processing elements of the BTEs include workload managers 14 and 15 and vector throughput engines 16, 17, 18, 19, 20, and 21. The workload managers 14-15 may be referred to as master processing elements. The vector throughput engines 16-21 may be referred to as slave processing elements. The workload managers 14-15 may traverse an accelerated data structure (ADS) with a ray issued by the system 10. The ADS is a spatial index that may be implemented as a tree type data structure and is used to represent a three-dimensional image that is divided into bounding volumes. The system 10 may use ray tracing techniques and the ADS to determine whether the ray intersects a particular bounding volume. In a particular embodiment, the workload managers 14-15 may use the ADS to determine whether the ray intersects a bounding volume.

The vector throughput engines 16-21 may determine whether the ray intersects a primitive contained within the bounding volume. For example, after a workload manager 14 determines that the ray intersects the bounding volume, the workload managers 14 may use the inboxes 22-23 to send a ray data structure that represents the ray to one or more of the vector throughput engines 16-21. For example, each of the vector throughput engines 16-21 may be assigned a particular bounding volume. A particular vector throughput engine of the vector throughput engines 16-21 may determine whether the ray intersects a primitive contained within the bounding volume assigned to the particular throughput engine. The vector throughput engines 16-21 may perform additional operations, such as determining the color of a pixel through which the ray passes. The processing elements ("master processing elements") assigned to the workload managers 14-15 and the processing elements ("slave processing elements") assigned to the vector throughput engines 16-21 may access a shared multiple core processing element memory cache 24-25. In a particular embodiment, the memory caches 24-25 may include a Level 2 (L2) cache.

The workload managers 14-15 and vector throughput engines 16-21 may access the inboxes 22-23. The inboxes 22-23 may include memory mapped address space. Each processing element of the workload managers 14-15 and the vector throughput engines 16-21 may include a memory mapped inbox and access to all of the other memory mapped inboxes 22-23. The inboxes 22-23 may include a low latency, high bandwidth communications network used by the workload managers 14-15 and the vector throughput engines 16-21 to communicate with each other. The inboxes 22-23 may be used by the workload managers 14-15 and the vector throughput engines 16-21 to perform rapid inter-processing element communications without having to access a main memory, such as a random access memory.

The workload managers 14-15 and the vector throughput engines 16-21 may use the inboxes 22-23 to communicate with and to distribute data processing work amongst each other. In a particular embodiment, the workload managers 14-15 and the vector throughput engines 16-21 may use separate outboxes (not shown). For example, processing results may be received at the separate outboxes. In another particular embodiment, the inboxes 22-23 may be configured to serve as both inboxes and outboxes. For example, the workload managers 14-15 may write the results of a processing function directly to one of the inboxes 22-23 associated with one of the vector throughput engines 16-21 that will use the results. The workload managers 14-15 and the vector throughput engines 16-21 may partition and redistribute workloads to improve overall system performance and throughput. While FIG. 1 shows two processing cores in the processor 12, the system 10 may include more than two processing cores.

A high speed bus 26 may enable the workload managers 14-15 to collect and distribute image processing related tasks to the vector throughput engines 16-21. The bus 26 may enable the vector throughput engines 16-21 to communicate with one another or with the workload managers 14-15. Communications using the bus 26 may be accomplished without using the caches 24-25. In a particular embodiment, a portion of the caches 24-25 may be allocated to the inboxes 22-23. Each of the inboxes 22-23 may be assigned to one of the workload managers 14-15 or one of the vector throughput engines 15-21. The workload managers 14-15 and the vector throughput engines 16-21 may use the inboxes 22-23 to communicate with each other, without using the memory 32. For example, the workload manager 14 may provide data and/or instructions to the vector throughput engine 18 via the inbox 22. In a particular embodiment, the memory space of the inboxes 22-23 may be mapped to a global memory address.

In a particular embodiment, portions of the cache 24-25 may be assigned to the inboxes 22-23 to create a low latency and high bandwidth communications network. The remaining portions of the caches 24-25 may be used to store information, such as primitive data structures, ray data structures, and portions of the spatial data structure that may be reused when tracing subsequent rays or rendering subsequent frames. Primitive data structures, ray data structures, and portions of the spatial data structure that may not be reused when tracing subsequent rays or rendering subsequent frames may be flushed from the cache 24-25.

Thus, the system 10 may be used to rapidly generate a three-dimensional image by populating a spatial data structure with primitive data structures to depict objects in a three-dimensional image. Ray data structures that represent rays may be traced through the three-dimensional image to add details, such as shadows and reflections, to enhance the realism of the three-dimensional image. The various operations involved in populating the spatial data structure and tracing the rays may be performed substantially in parallel using the workload managers 14-15 and the vector throughput engines 16-21. By performing the operations substantially in parallel, the three-dimensional image may be rendered faster than when the operations are performed substantially in a serial manner.

Figure 2:
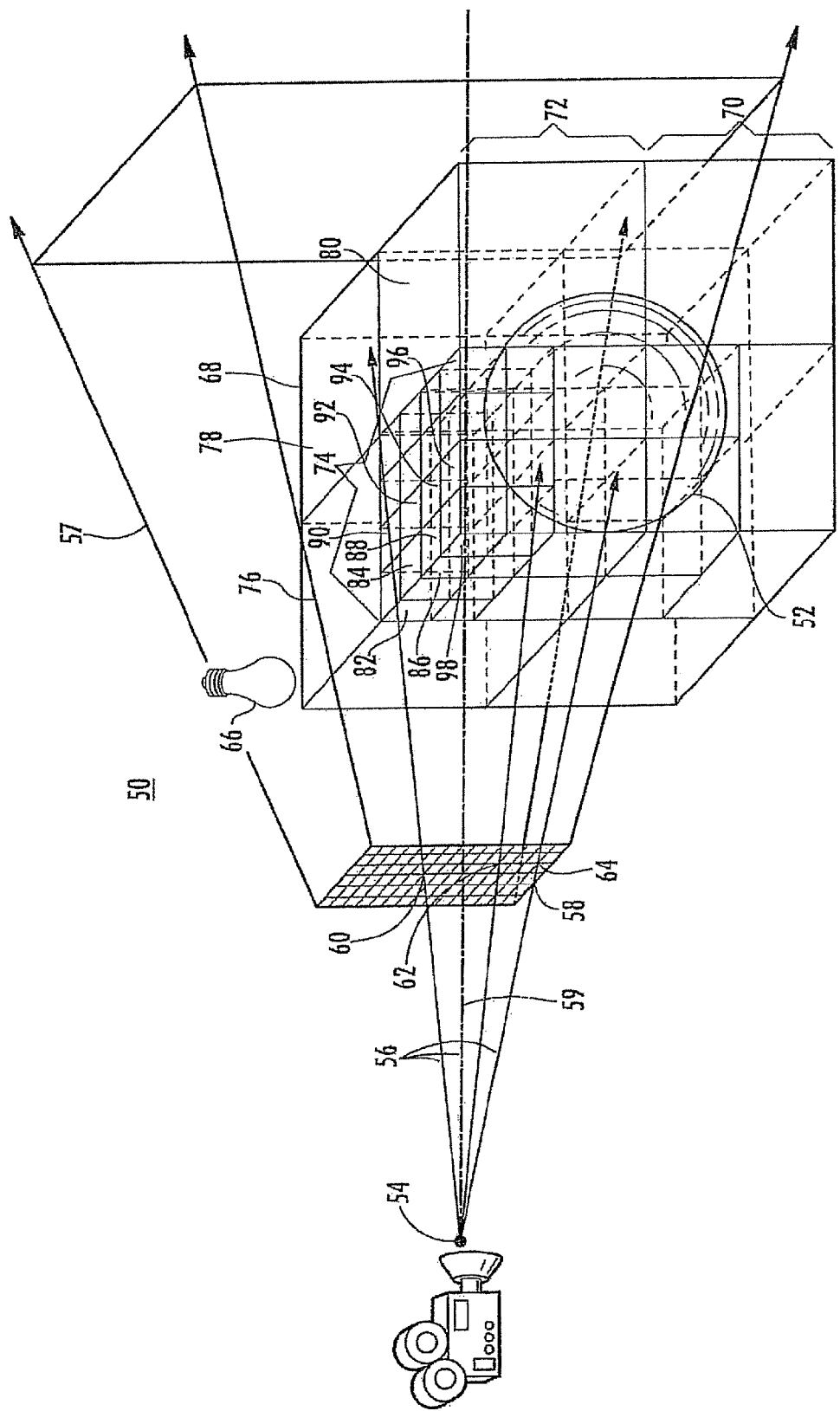
FIG. 2 is a logical representation of a first system to render a three-dimensional image.

Referring now to FIG. 2, a logical representation of a first system to render a three-dimensional image is depicted and generally designated 50. The system 50 depicts bounding volumes having sizes that vary according to their respective distances from a reference. The system 50 includes an object 52 viewed by an observer as represented by ray origin 54. The origin 54 may be associated with a camera viewpoint for a given frame.

Rays 56 extending from the ray origin 54 may create a perspective view of the object 52. The rays 56 may have properties and behavioral qualities that are similar to light rays. The rays 56 may intersect a pixel plane 58 that includes multiple pixels. A pixel (i.e., a picture element) may be considered the smallest piece of information in a three-dimensional image. Pixels may be arranged in a two-dimensional grid. Each pixel may be a sample of an original image and may include color components. The pixel plane 58 may be rendered as a two-dimensional image by the image processing system 10 of FIG. 1. The resultant two-dimensional image may be displayed at a display device, such as the display device 39. The display device 39 may use pixels of different colors to render the two-dimensional image.

One of the rays 56 may traverse the system 50 and the pixel plane 58, where the final two-dimensional picture will be rendered by the system 10 of FIG. 1. Pixels 60, 62, 64 may represent intersections of the rays 56 with the object 52. The object 52 may include part of a three-dimensional image to be rendered by the system 10. While only a single object 52, i.e., a sphere, is shown in FIG. 2, additional objects (not shown) may be present. Each of the objects may be represented by primitives.

The object 52 and the surrounding space may be divided into bounding volumes that correspond to nodes of a spatial data structure. For example, a large bounding volume 68 may correspond to a first node of a spatial data structure that represents the entire viewable three-dimensional image. The three-dimensional image may be divided into portions via bounding volumes. For example, the bounding volume 68 may be divided into bounding volumes 70 and 72. The bounding volumes 70 and 72 may be further divided into bounding volumes 74, 76, 78, and 80, each of which roughly correspond to a quarter of the bounding volume 68. The bounding volumes 74, 76, 78, and 80 may be further subdivided into smaller bounding volumes. For example, the bounding volume 74 may be further subdivided into smaller bounding volumes 82, 84, 86, 88, 90, 92, 94, 96, and 98. In a particular embodiment, the virtual space may be divided into different sized bounding volumes using other types of algorithms. In a particular embodiment, the relative sizes of the bounding volumes may be modified according to their respective distances from a reference. For example, the ray origin 54 may be a reference. Other references may include a point within the image data, such as a portion of a ray. In another embodiment, a reference may include a ray 59 that corresponds to a center of a view frustum 57. Still another reference may include the view frustum 57 or boundary of the view frustum 57. The bounding volumes closest to the reference (e.g., the bounding volumes 82, 84, 86, 88, 90, 92, 94, and 96) may be smaller than the bounding volumes that are farther from the reference (e.g., the bounding volumes 52, 70).

The view frustum 57 may include a region of space in a modeled world (i.e., the three-dimensional image) that is viewable by a viewer. The view frustum 57 may represent the field of view of a notional camera. The exact shape of this region may vary based on a type of camera lens that is being simulated. In FIG. 2, the view frustum 57 is depicted as a rectangular pyramid. The planes that cut the view frustum 57 perpendicular to the viewing direction may be referred to as the near plane and the far plane. Objects that are closer to the ray origin 54 than the near plane or beyond the far plane may not be drawn.

FIG. 2 also shows a light source 66. The light source 66 may illuminate the object 52. Depending on the location of the light source 66 and the object 52, the light source 66 may cause shadows to be cast onto other objects (not shown) within the scene. In a particular embodiment, the pixel plane 58 may include millions of pixels. Each individual pixel may display a different color to render the two-dimensional picture on a display device, such as the display 39 of FIG. 1. A ray tracing algorithm may calculate the colors that the rays 56 encounter in the system 50. An image processing system may assign colors encountered to the pixels 60, 62, and 64 of FIG. 2 when one or more of the rays 56 passes through the pixels 60, 62, and 64 on its way from the origin 54 to the object 52.

Where more than one ray intersects a pixel, the color of the pixel may be determined based on combining a color contribution from each of the rays that intersect the pixel. Another pixel may have a single ray intersect the pixel, resulting in the single ray determining the resulting color of the pixel. Some pixels may not be intersected by any of the rays issued by the image processing system, in which case their color may be determined, approximated or assigned by algorithms within the image processing system. For example, if a ray does not intersect an object within the scene it may be assigned a default background color, e.g., approximating the color of the sky.

Many factors may contribute to the color of the object 52 struck by the rays 56. For example, the light source 66 within the three-dimensional scene may illuminate the object 52. In addition, physical properties of the object 52 may contribute to the color of the object 52. For example, when the object 52 is reflective or transparent, other non-light source objects (not shown) may also contribute to the color of the object 52. To illustrate, a first object with a reflective surface may reflect a portion of a second object that is located near the first object, thereby contributing to a color of the reflective surface of the first object.

To determine the effect of a ray intersecting the object 52 on other objects (not shown) located near the object 52, secondary rays may be issued from the point where an original ray intersects the object 52. For example, one type of secondary ray may be a shadow ray. A shadow ray may be used to determine the contribution of light at the point where the original ray intersects the object 52. The shadow ray may be traced from a point of intersection of an original ray and the object 52 to the light source 66. When the original ray reaches the light source 66 without encountering another object, the light source 66 may illuminate the object 52 struck by the original ray at the point where the original ray struck the object 52. When the object 52 is translucent or transparent, the light source 66 may illuminate the object 52 at the point where the original ray 56 struck the object 52. The total contribution of color and light of all secondary rays (e.g., shadow rays, transmitted rays, reflected rays, etc.) may contribute to the final color of the pixel through which the original ray passes.

A second type of secondary ray may be a transmitted ray. A transmitted ray may be used to determine what color light may be transmitted through the body of the object 52. A ray data structure representation of a transmitted ray may be created by the image system 10 when the object 52 intersected by the original ray has transparent or translucent properties. For instance, when the object includes colored glass, a transmitted ray intersecting the glass may be colored based on the color of the glass at the point at which the transmitted ray emerges from the colored glass. A transmitted ray may traverse through the object 52 at an angle relative to the angle at which the original ray struck the object 52.

A third type of secondary ray may be a reflected ray. A reflected ray may be used to depict color or light that is reflected by the object 52. When the object 52 has reflective properties, such as a metal surface, a reflected ray may be issued to depict color or light that is reflected by the object 52 on to other objects (not shown). Reflected rays may traverse away from the object 52 at an angle relative to the angle at which the original ray intersects the object 52.

Thus, by tracing the rays 56 through a three-dimensional image, additional details can be added, such as shadows and reflections, to enable the three-dimensional image to be rendered in a photo realistic manner. By using an appropriate spatial data structure for representing the three-dimensional image (e.g., the spatial data structure of FIG. 3) and an appropriate system (e.g., the system of FIG. 1) for ray tracing, the ray tracing may be performed substantially in parallel, thereby enabling the two-dimensional image 58 to be generated faster than when the ray tracing is performed substantially in a serial manner.

Figure 3:
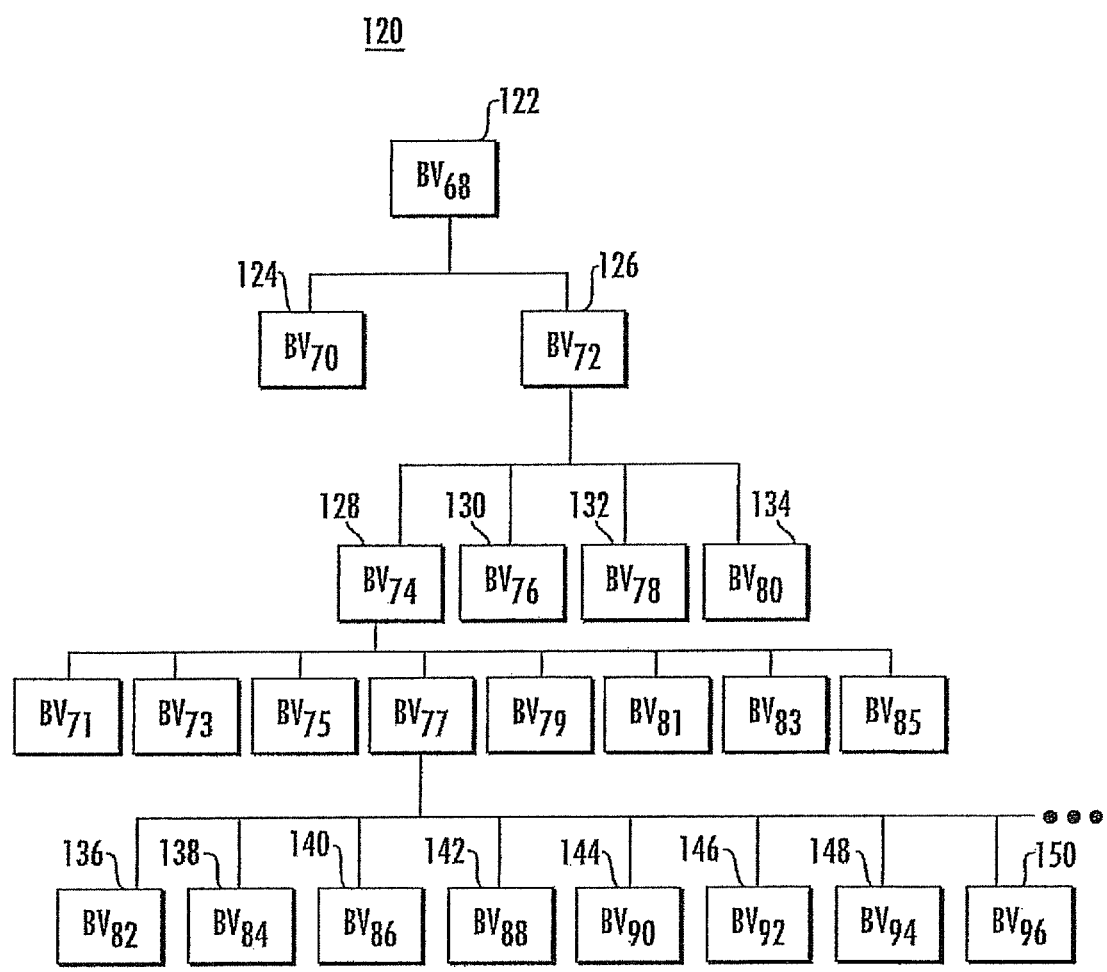
FIG. 3 is a first exemplary embodiment of a spatial data structure.

Referring to FIG. 3, a first exemplary embodiment of a spatial data structure is depicted and generally designated 120. The spatial data structure 120 may be a spatial index, such as a kd-tree. Node 122 of the spatial data structure 120 may correspond to bounding volume 68 of FIG. 2. Bounding volumes 70, 72 of FIG. 2 may be represented by nodes 124, 136 of FIG. 3. Nodes 128, 130, 132, and 134 of FIG. 3 may correspond to bounding volumes 74, 76, 78, 80 of FIG. 2, respectively. Leaf nodes 136, 138, 140, 142, 144, 146, 148, and 150 may correspond to the smallest bounding volumes 82, 84, 86, 88, 90, 92, 94, and 96 of FIG. 2.

The spatial data structure 120 may be used to determine whether an issued ray intersects any of the objects within a three-dimensional image to be rendered by a graphics generation system. The spatial data structure 120 may represent a division of a three-dimensional image into relatively smaller bounding volumes. Leaf nodes of the spatial data structure 120 may correspond to bounding volumes that include primitives. The leaf nodes may include primitive data structures that represent the primitives in the corresponding bounding volumes. An image processing system may use the boundaries of the smaller bounding volumes to determine whether a ray intersects primitives associated with the smaller bounding volumes. When a ray intersects a bounding volume that contains primitives, a ray intersection test may be performed using the projected trajectory of the ray as described by the ray data structure against the primitive data structures that represent the primitives.

When a ray does not intersect a particular bounding volume, a ray intersection test may not be performed against the primitive data structures in the leaf node that corresponds to the particular bounding volume. Thus, by reducing the number of ray-primitive intersection tests that may be performed, the use of a spatial index, such as the spatial data structure 120, may increase the performance of a ray tracing image processing system, such as the system 10 of FIG. 1.

Different types of spatial indexes may be used for the spatial data structure 120, such as an oc-tree, a kd-tree, a binary space partitioning trees (BSP trees), another type of data structure that can be used as a spatial index, or any combination thereof. While any type of spatial index may be used for the spatial data structure 120, for ease of describing the various embodiments, a kd-tree is used as the spatial index for the examples in this disclosure.

The kd-tree may be created by recursively splitting the three-dimensional image into bounding volumes using axis-aligned planes, such that the kd-tree has a node corresponding to each bounding volume. For example, the three-dimensional image may be split using planes aligned on an x-axis (horizontal axis) or a y-axis (vertical axis). Initially, the scene may be split in two. Each half may then be further split until the three-dimensional image is split into multiple bounding volumes. Each bounding volume may have a corresponding node in the kd-tree, resulting in a hierarchical organization of the kd-tree. Each level of the kd-tree may be recursively traversed to determine where a next level of the kd-tree may be found. The kd-tree may be created during a construction phase to achieve optimum performance when traversing the kd-tree. Thus, the kd-tree may be constructed by dividing a three-dimensional image into bounding volumes, with each bounding volume adding a corresponding node to the kd-tree. An image processing system, such as the image processing system 10 of FIG. 1, may use the ADS construction algorithm 45 to determine when to divide a larger bounding volume into two smaller bounding volumes.

The ADS construction algorithm 45 may determine when to divide a larger bounding volume into smaller bounding volumes using distance determination information. For example, how many primitives are in a particular bounding volume may determine when the particular bounding volume is partitioned into smaller bounding volumes. For example, when a particular bounding volume contains more primitives than a predetermined threshold, the ADS construction algorithm 45 may divide the particular bounding volume into smaller bounding volumes. Other criteria for determining when to partition a particular bounding volume into smaller volumes may be an amount of space contained within the particular bounding volume and how many primitives are intersected by an axis-aligned plane that creates the particular bounding volume.

The spatial data structure 120 may be a hierarchical structure representing the partitioning of a three-dimensional image, such as the three-dimensional image 50 of FIG. 2. The spatial data structure 120 may include nodes, branches and leaves. For instance, internal node 126 within the spatial data structure 120 may represent a relatively large bounding volume 72. Node 126 may contain branches to sub-nodes 128, 130, 132, and 134 that may respectively represent four relatively smaller bounding volumes 74, 76, 78, and 80. The bounding volumes 74, 76, 78, and 80 may be created by partitioning the relatively large bounding volume 72 by a splitting plane.

In a kd-tree, each internal node may include branches to other nodes. An internal node may store information, such as pointers to leaf nodes, as well as information about the boundaries of the bounding volume. In a particular embodiment, the internal node may include branches (i.e., pointers) to leaf nodes. A leaf node 136 is a node that may not be further sub-divided into smaller volumes. The leaf node 136 may contain primitive data structures that represent primitives. An internal node may also contain branches to other internal nodes when the bounding volume corresponding to the internal node is further subdivided into smaller bounding volumes. An internal node may also include the information specifying along what axis the splitting plane was drawn and where along the axis the splitting plane was drawn.

The ADS construction algorithm 45 of FIG. 1 may continue to partition a bounding volume 77 when the bounding volume 77 contains more than a predetermined threshold of primitives. For example, when the predetermined threshold is two primitives, a bounding volume with more than two primitives may be divided into smaller bounding volumes. Accordingly, the ADS construction algorithm 45 may stop partitioning a bounding volume 90 that contains less than or equal to the number of primitives associated with the predetermined threshold. Such a node may be a leaf node of the kd-tree, such as the leaf node 140, because it may not be further subdivided.

The spatial data structure 120 may be stored in a cache, such as the shared memory cache 24 of FIG. 1. In a particular embodiment, the kd-tree may be optimized for storage in the shared memory cache 24. Although FIG. 3 shows a spatial data structure 120 corresponding to a three-dimensional image, another kd-tree embodiment may correspond to a two dimensional image to be rendered by an image processing system.

With collective reference to FIGS. 1-3, the system 10 may issue rays starting from the top of the pixel plane 58 and continue issuing rays, one ray per pixel, moving down the grid of pixels until a ray has been issued for each pixel in the plane 58. Multiple rays may ultimately issue through select pixels.

The workload manager 14 may perform operations related to the traversal of the rays 56 through the three-dimensional image using ray data structures that represent the rays 56 and the spatial data structure 120. For instance, the workload manager 14 may traverse the spatial data structure 120 by taking branches to nodes 122, 126, and 128 that represent bounding volumes 68, 72, and 74 intersected by a ray until a leaf node 150 is reached. To illustrate, the workload manager 14 may use the coordinates and trajectory of the ray to determine whether the ray intersects bounding volumes 68, 72, and 74 that are represented by the nodes 122, 126, and 128, respectively, of the spatial data structure 120. The workload manager 14 may continue traversing the spatial data structure 120 until the workload manager 14 identifies a leaf node corresponding to a bounding volume 96 that contains only primitives that is intersected by the ray. After identifying the leaf node, the workload manager 14 may send information specifying the ray and an intersected pixel 64, as well as information defining an intersected node to a vector throughput engine 18.

After the workload manager 14 sends the ray data structure to the vector throughput engine 18, the workload manager 14 may begin traversing through the spatial data structure 120 using another ray data structure that represents another ray of the rays 56. Thus, the workload manager 14 may continuously traverse through the spatial data structure 120 using ray data structures representing the rays 56 while the vector throughput engines 16-21 determine whether rays 56 intersect an object 52 within the three-dimensional image. The vector throughput engines 16-21 may perform ray-primitive intersection tests after they have received the information specifying the ray and the intersected bounding volume (i.e., represented by the leaf node). The vector throughput engines 16-21 may determine the color of the object 52 at the point where it is intersected by the ray 56.

After determining the color of the object 52 at the intersection point, the vector throughput engine 16 may update the color of the pixel 60 through which one of the rays 56 passes. For example, the vector throughput engine 16 may write to a frame buffer memory location that corresponds to the pixel 60.

The vector throughput engines 16-21 may generate secondary ray data structures that represent secondary rays. For example, the vector throughput engine 16 may generate a reflected ray data structure and a transmitted/refracted ray data structure. Both secondary rays may originate from a point where a ray intersects the object 52. As described herein, the secondary rays may be used to determine additional color contribution to the object 52 at the point where the ray intersects the object 52. The generation of secondary ray data structures may include determining a trajectory for each secondary ray and tagging each secondary ray data structure such that the additional color contribution from the secondary ray may be used to update the color of the pixel 60 through which the ray passes. The vector throughput engine 16 may use an inbox 22 to send secondary ray data structures (that represents secondary rays) to a workload manager 14. The workload manager 14 may receive the secondary ray data structures and use the trajectory and other information associated with the secondary rays to traverse the spatial data structure 120.

Thus, by using a spatial data structure, such as the spatial data structure 120, to represent a three-dimensional image may enable rapid traversal of the spatial data structure compared to other types of spatial data structures. Rapid traversal of the spatial data structure may enable the three-dimensional image to be generated relatively quickly, particularly when multiple processing elements can perform the operations to generate the three-dimensional image substantially in parallel.

Figure 4:
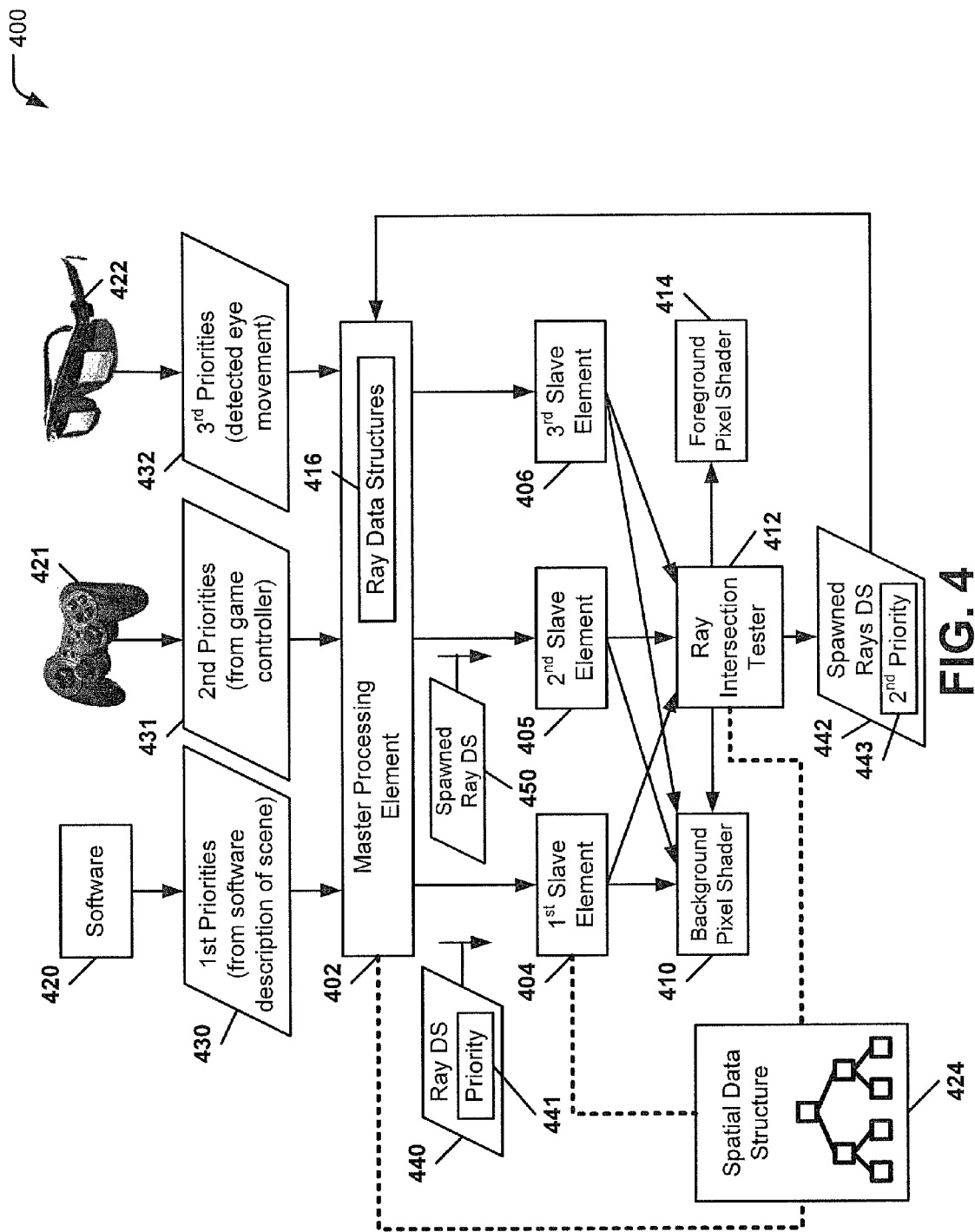
FIG. 4 is a block diagram of a system to set priorities for rays.

Referring to FIG. 4, a block diagram of a system to set priorities for rays is depicted and generally designated 400. The system 400 includes a master processing element 402, a first slave processing element 404, a second slave processing element 405, a third slave processing element 406, a background pixel shader 410, a ray intersection tester 412, and a foreground pixel shader 414. The system 400 may include or be included within a computing system, such as the system 10 of FIG. 1.

The master processing element 402 may receive information used to prioritize rays for processing from various sources. For example, the master processing element 402 may receive priority information from a process or application executing at the computing system (such as software 420). In another example, the master processing element 402 may receive the priority information from input devices, output devices, other devices of the computing system, or any combination thereof. To illustrate, the master processing element 402 may receive priority information from a controller 421, from goggles 422, or from another input or output device. The priority information, which is illustrated in FIG. 4 by priorities 430, 431, and 432, may indicate which rays should be given a particular priority. For example, first priorities 430 may be coded in the software 420, based on a render context associated with an object in a three-dimensional image, based on motion properties of the object, based on other properties associated with the object, or any combination thereof The render context is a data structure associated with an object that includes information on how to convert a geometric primitive into individual pixels for display at a display device. To illustrate, when the motion properties of the object indicate that the object is increasing in size (e.g., the object is moving towards a user's field of vision), rays that intersect the object may be given a higher priority than other rays. When the motion properties of the object indicate that the object is decreasing in size (e.g., the object is moving out of the user's field of vision), rays that intersect the object may be given a lower priority than other rays.

The master processing element 402 may receive the priorities 430-432 from the software 420, the controller 421, the goggles 422 another device capable of providing priorities, or any combination thereof. The master processing element 402 may assign a priority to each ray of rays 416 based on the received priorities 430-432. For example, the master processing element 402 may assign the priority 441 to the ray data structure 440 (that represents a ray) based on one or more of the priorities 430-432. In a particular embodiment, the master processing element 402 may use a weighted average of the priorities 430-432 to assign the priority 441 to the ray data structure 440. The master processing element 402 may send a ray data structure, such as the ray data structure 440, to one of the slave processing elements 404-406.

The priority 441 of the ray data structure 440 may be used in many different ways. For example, the priority 441 of the ray data structure 440 may affect an order in which ray data structures received at an inbox or queue of a particular slave processing element are processed. When a particular processing element (e.g., one or more of the slave processing elements 404-406, the ray intersection tester 412, the background pixel shader 410, and the foreground pixel shader 414) receives more than one ray data structure, the particular processing element may process a ray data structure with a higher priority before processing a ray data structure with a lower priority. To illustrate, the first slave processing element 404 may have an inbox (not shown) to receive ray data structures, such as the ray data structure 440. The first slave processing element 404 may select and process ray data structures from the inbox based on the priority assigned to each of the ray data structures. When the first slave processing element 404 has received four ray data structures in the inbox, the first slave processing element 404 may process the ray data structures based on the priority of the ray data structures (e.g., higher priority ray data structures may be processed before lower priority ray data structures). As another example, when the priority 441 indicates a high priority, the high priority may cause the ray data structure 440 to spawn (i.e., generate) more ray data structures (representing spawned rays), resulting in a higher render quality. To illustrate, a ray represented by the ray data structure 440 may spawn a first set of rays, the first set of spawned rays may spawn a second set of rays, and so on. In this example, the number of generations a particular ray is spawned may be based on the priority 441 of the ray data structure 440 that represents the particular ray. In yet another example, a high priority 441 may indicate that the ray represented by the ray data structure 440 may spawn fewer rays, resulting in faster rendering. In yet another example, the priority 441 may be used in conjunction with a local parameter of the receiving processing element (e.g., the first slave processing element) to affect how the ray data structure 440 is processed by the receiving processing element. To illustrate, the receiving processing element may use the priority 441 when determining a number of reflective rays to cast and a number of refractive rays to cast. A high priority may cause more reflective rays to be cast than refractive rays while a low priority may cause more refractive rays to be cast than reflective rays. In still another example, the priority 441 may temporarily affect an execution priority of a particular processing element that is processing the ray data structure 440. To illustrate, when the priority 441 indicates a high priority, the first slave processing element 404 may be given a high priority when the first slave processing element 404 is processing the ray data structure 440 and may be given a default priority (e.g., a lower priority) after the first slave processing element 404 has completed processing the ray data structure 440. Thus, the priority 441 of the ray data structure 440 may determine an order in which the ray data structure 440 is processed by a processing element, may determine how many generations of rays are spawned (i.e., how many spawned ray data structures are generated), may interact with a local parameter of the processing element processing the ray data structure 440, may determine a priority of the processing element processing the ray data structure 440, may cause another action to be performed based on the priority of the ray data structure 440, or any combination thereof.

A spatial data structure 424 may be accessible to a processing element for traversal. For example, one or more of the slave processing elements 404-406, the ray intersection tester 412, the background pixel shader 410, and the foreground pixel shader 414 may access and traverse the spatial data structure 424. The spatial data structure 424 may be accessed and traversed substantially in parallel by the slave processing elements 404-406, the ray intersection tester 412, the background pixel shader 410, and the foreground pixel shader 414.

The slave processing elements 404-406 may receive a ray data structure, such as the ray data structure 440, and may traverse the spatial data structure 424 based on properties of the ray data structure 440 (e.g., which direction the ray represented by the ray data structure 440 is travelling, an intensity of the ray represented by the ray data structure 440, a width of the ray represented by the ray data structure 440, etc.) to determine whether the ray represented by the ray data structure 440 intersects an object in a three dimensional image. The slave processing elements 404-406 may traverse the spatial data structure 424 until a leaf node is encountered. After encountering the leaf node, the slave processing elements 404-406 may send the ray data structure 440 to the ray intersection tester 412 to determine whether the ray data structure 440 intersects any of the primitive data structures in the leaf node, indicating that the ray represented by the ray data structure 440 intersects an object in the three-dimensional image.

In operation, the software 420, the controller 421, and the goggles 422 may send the priorities 430-432 to the master processing element 402. For example, the software 420 may send the first priorities 430 that are based on a software description of a scene to the master processing element 402. To illustrate, in a first person shooter video game, a particular object may represent a resource (e.g. a weapon, additional ammunition, food, etc.) that a user can acquire. To draw attention to the particular object, the game designer may use the software 420 to specify the first priorities 430 to draw the user's attention to the particular object by having the particular object glow. The ray data structures representing the rays that are used to make the particular object glow may be given a higher priority than other rays by the master processing element 402 based on the first priorities 430.

In another example, the controller 421 may receive control input (e.g., joystick movement) indicating that the user is turning a viewpoint in a particular direction to view a particular portion of a three-dimensional image displayed at a display device. Rays associated with that particular portion of the three-dimensional image may be given a higher priority than other portions of the three-dimensional image. For example, when a character in a video game is turning to the right, the rays displayed at the right portion of the display device may be given priority over rays displayed at other portions of the display device.

In another example, the goggles 422 may include a display device for a user to view a three-dimensional image. The goggles 422 may be capable of detecting eye movement of the user and providing the priorities 432 to the master processing element 402 based on the detected eye movement. For example, when the user looks up at a particular portion of the three-dimensional image (e.g., the top portion), the third priorities 432 may indicate that the rays in the particular portion of the three-dimensional image are to be given a higher priority than other rays.

After the master processing element 402 receives the priorities 430-432, the master processing element 402 may assign priorities to the ray data structures 416 based on the priorities 430-432. For example, the master processing element 402 may assign the priority 441 to the ray data structure 440. The master processing element 402 may select the ray data structure 440 from the ray data structures 416 and send the ray data structure 440 to one of the slave processing elements 404-406 based on the priority 441.

The master processing element 402 may identify a portion of a three-dimensional image that the ray (represented by the ray data structure 440) passes through. The master processing element 402 may identify one of the slave processing elements 404-406 that is associated with the portion of the three-dimensional image that the ray passes through and send the ray data structure 440 to the identified slave processing element. For example, the master processing element 402 may determine that the ray (represented by the ray data structure 440) passes through a portion of a three-dimensional image that is associated with the first slave processing element 404 and may send the ray data structure 440 to the first slave processing element 404.

The first slave processing element 404 may receive the ray data structure 440 along with other ray data structures (not shown). The first slave processing element 404 may process the ray data structure 440 from among the other received ray data structures based on the priority 441. For example, the first slave processing element 104 may process received ray data structures that have a higher priority before processing received ray data structures that have a lower priority. The first slave processing element 404 may traverse the spatial data structure 424 until a leaf node is reached. The first slave processing element 404 may send the ray data structure 440 to the background pixel shader 410 when the leaf node is empty (i.e., the leaf node does not include any primitives). The empty leaf node may indicate that the associated portion of the three-dimensional image is empty. When the leaf node is empty, the background pixel shader 410 may be used to provide a background color, such as the color of a sky in the three-dimensional image.

When the leaf node includes one or more primitive data structures, the first slave processing element 404 may send the ray data structure 440 to the ray intersection tester 412. The ray intersection tester 412 may receive ray data structures, such as the ray data structure 440, from the slave processing elements 404-406. The received ray data structures may be queued at a mailbox (not shown) associated with the ray intersection tester 412. The ray intersection tester 412 may process the received ray data structures based on a priority of each ray data structure. For example, the ray intersection tester 412 may process a received ray data structure that has a higher priority before processing other received ray data structures that have a lower priority.

The ray intersection tester 412 may determine whether the ray (represented by the ray data structure 440) intersects one or more primitive data structures of the leaf node. When the ray (represented by the ray data structure 440) does not intersect one or more primitive data structures of the leaf node, the ray intersection tester 412 may send the ray data structure 440 to the background pixel shader 410. For example, when the ray intersection tester 412 determines that the ray (represented by the ray data structure 440) passes in-between the objects located in that particular portion of the three-dimensional image, i.e., the ray does not affect a color or texture of any object, the ray intersection tester 412 may send the ray data structure 440 to the background pixel shader 410.

When the ray (represented by the ray data structure 440) intersects one or more of the primitive data structures of the leaf node, the ray intersection tester 412 may send the ray data structure 440 to the foreground pixel shader 414. In a particular embodiment, the ray intersection tester 412 may spawn a second set of rays (represented by the spawned ray data structures 442) and assign a second priority 443 to the spawned ray data structures 442 based on the priority 441 of the ray data structure 440. The ray intersection tester 412 may determine whether one or more of the spawned rays (represented by the spawned ray data structures 442) intersect any of the primitive data structures in the leaf node. The ray intersection tester 412 may send the spawned ray data structures 442 to the master processing element 402.

Thus, by assigning a priority to each of the ray data structures 416, each of the ray data structures 416 may be processed by the master processing element 402, the slave processing elements 404-406, the background pixel shader 410, the ray intersection tester 412, the foreground pixel shader 414, or a combination thereof, based on the priorities 430-432. For example, the ray data structure 440 that has a higher priority 441 may be processed before ray data structures 416 that have a lower priority. By using multiple processing elements to perform ray tracing operations, ray tracing of a three dimensional image may be performed substantially in parallel.

Figure 5:
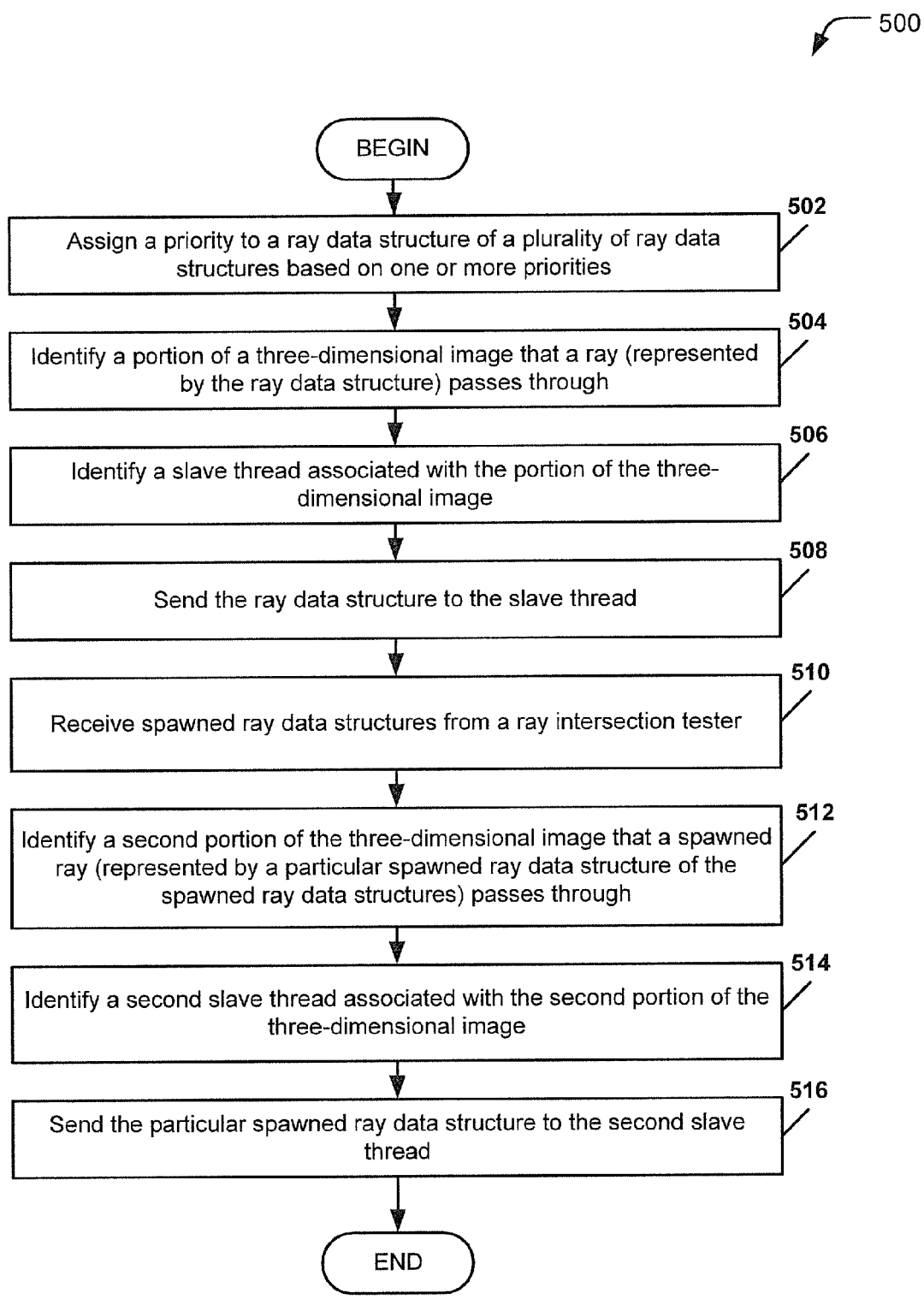
FIG. 5 is a first flow diagram of a method to set priorities for rays.

Referring to FIG. 5, a flow diagram of a method to set priorities for rays is depicted and generally designated 500. The method may be performed by a master processing element, such as the master processing element 402 of FIG. 4.

The method begins when a master processing element assigns a priority to a ray data structure of a plurality of ray data structures based on one or more priorities, at 502. For example, in FIG. 4, the master processing element 402 may assign the priority 441 to the ray data structure 440 based on the priorities 430-432. Moving to 504, a portion of a three-dimensional image through which a ray (represented by the ray data structure) passes is identified. Proceeding to 506, a slave processing element associated with the portion of the three-dimensional image is identified. Advancing to 508, the ray data structure is sent to the slave processing element. For example, in FIG. 4, the master processing element 402 may determine that the ray (represented by the ray data structure 440) passes through a portion of the three-dimensional space associated with the first slave processing element 404 and may send the ray data structure 440 to the first slave processing element 404.

Continuing to 510, spawned ray data structures may be received from a ray intersection tester. The spawned ray data structures may represent spawned rays generated after the ray intersection tester receives the ray data structure from the slave processing element. For example, in FIG. 4, the ray intersection tester 412 may generate the spawned ray data structures 442 and send the spawned ray data structures 442 to the master processing element 402 in response to determining that the ray intersects a primitive. Moving to 512, a second portion of the three-dimensional image that a particular spawned ray (represented by a spawned ray data structure of the spawned ray data structures) passes through may be identified. Proceeding to 514, a second slave processing element associated with the second portion of the three-dimensional image may be identified. Advancing to 516, the spawned ray data structure (that represents the particular spawned ray) may be sent to the second slave processing element and the method ends. For example, in FIG. 4, the master processing element 402 may select the spawned ray data structure 450 from the spawned ray data structures 442, identify the second slave processing element 405 as associated with a portion of the three-dimensional image that the ray (represented by the spawned ray data structure 450) passes through, and send the spawned ray data structure 450 to the second slave processing element 405.

Thus, by assigning a priority to ray data structures that represent rays in a ray tracing system, the ray data structures may be processed by various processing elements (e.g., a master processing element, slave processing elements, pixel shader processing elements, and a ray intersection tester processing element) based on the priorities. For example, the processing elements may process ray data structures having a higher priority before processing ray data structures having a lower priority. By using multiple processing elements to perform ray tracing operations, ray tracing of a three dimensional image may be performed substantially in parallel.

Figure 6:
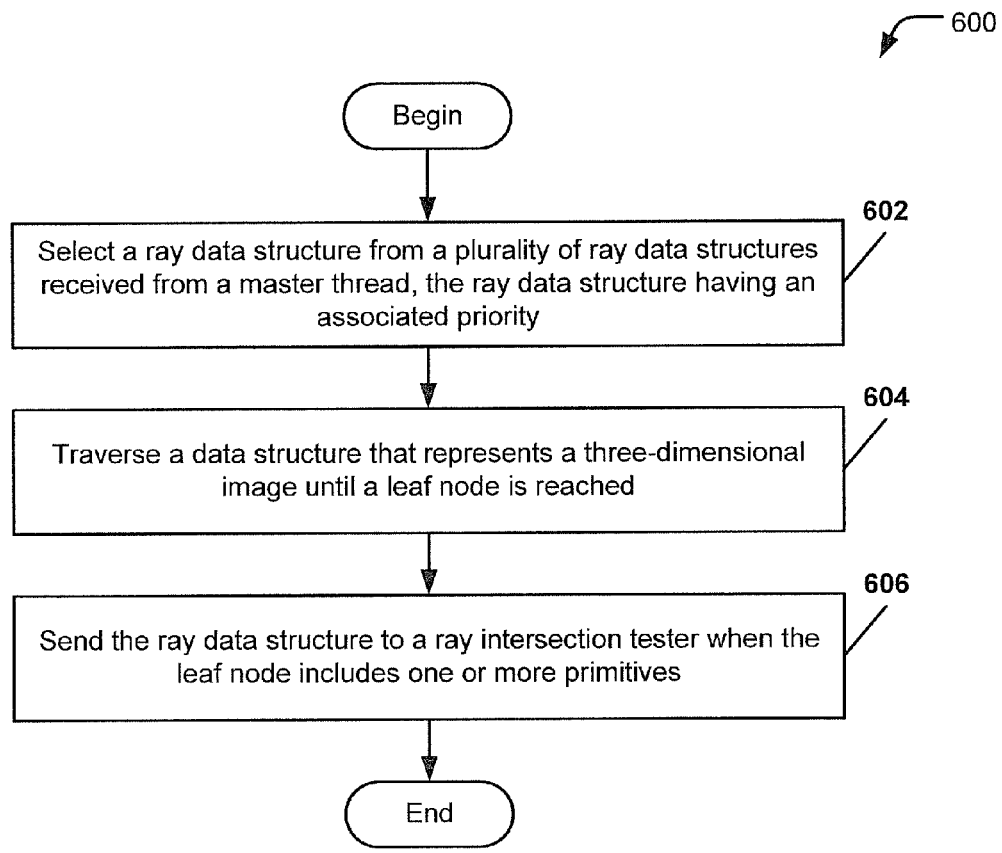
FIG. 6 is a second flow diagram of a method to set priorities for rays.

Referring to FIG. 6, a flow diagram of a method to set priorities for ray data structures is depicted and generally designated 600. The method may be performed by a slave processing element, such as one of the slave processing elements 404-406 of FIG. 4.

The method begins when a ray data structure is selected from a plurality of ray data structures received from a master processing element, at 602. The ray data structure may have an associated priority. The ray data structure may be selected from the plurality of ray data structures based on the associated priority. For example, the associated priority of the ray data structure may be higher than the priorities of the remaining plurality of ray data structures. Moving to 604, a spatial data structure that represents a three-dimensional image may be traversed until a leaf node is reached. For example, in FIG. 4, the first slave processing element 404 may receive the ray data structure 440 from the master processing element 402 and traverse the spatial data structure 424. The spatial data structure may include data related to portions of the three-dimensional image. For example, in FIG. 2, a three-dimensional space representing a bounding volume 68 is divided into smaller bounding volumes. The bounding volumes of the three-dimensional space may correspond to nodes of the spatial data structure. Thus, traversing the spatial data structure may corresponds to inspecting smaller and smaller bounding volumes of the three-dimensional space until a smallest bounding volume into which a particular region of the three-dimensional space is subdivided is reached. The smallest bounding volume may correspond to a particular leaf node of the spatial data structure.

Returning to FIG. 6 and advancing to 606, the ray data structure is sent to a ray intersection tester when the leaf node includes one or more primitive data structures and the method ends. For example, in FIG. 4, when the first slave processing element 404 traverses the spatial data structure 424 and finds a leaf node, the first slave processing element 404 may send the ray data structure 440 to the ray intersection tester 412 when the leaf node includes one or more primitive data structures.

Thus, a slave processing element may receive a ray data structure from a master processing element and traverse a spatial data structure. When the slave processing element encounters a leaf node of the spatial data structure, the slave processing element may send the ray data structure to a ray intersection tester when the leaf node has one or more primitive data structures. By using multiple processing elements to perform ray tracing operations, ray tracing of a three dimensional image may be performed substantially in parallel.

Figure 7:
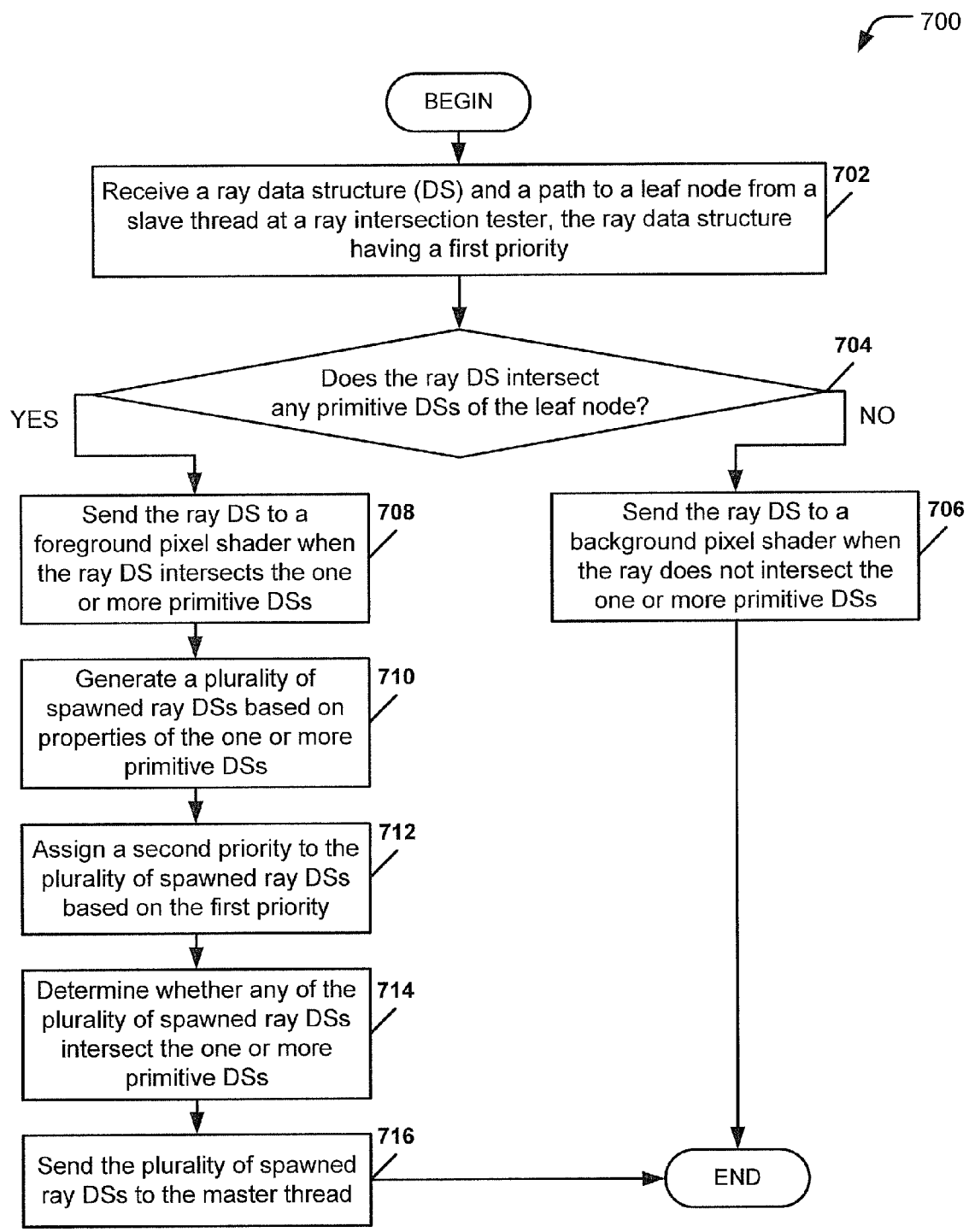
FIG. 7 is a third flow diagram of a method to set priorities for rays.

Referring to FIG. 7, a flow diagram of a method to set priorities for rays is depicted and generally designated 700. The method may be performed by a ray intersection tester, such as the ray intersection tester 412 of FIG. 4.

The method begins when a ray data structure (that represents a ray) and a path to a leaf node are received from a slave processing element at a ray intersection tester, at 702. The ray data structure may have a first priority. Moving to 704, the ray intersection tester determines whether the ray (represented by the ray data structure) intersects one or more primitives (represented by primitive data structures) of the leaf node. For example, in FIG. 4, the ray intersection tester 412 may receive the first ray data structure 440 from the first slave processing element 404 and determine whether a ray (represented by the ray data structure 440) intersects one or more primitives (represented by primitive data structures in a leaf node of the spatial data structure 424). Advancing to 706, the ray data structure is sent to a background pixel shader when the ray does not intersect the one or more primitives and the method ends. For example, in FIG. 4, when the ray (represented by the ray data structure 440) does not intersect one or more primitives of a three-dimensional image, the ray intersection tester 412 may send the ray data structure 440 to the background pixel shader 410.

Proceeding to 708, the ray data structure is sent to a foreground pixel shader when the ray (represented by the ray data structure) intersects the one or more primitives of the three-dimensional image. For example, in FIG. 4, when the ray (represented by the ray data structure 440) intersects one or more primitives of the three-dimensional image, the ray intersection tester 412 may send the ray data structure 440 to the foreground pixel shader 414. Continuing to 710, spawned ray data structures (representing spawned rays) are generated based on properties of the one or more primitives (represented by the primitive data structures). For example, in FIG. 4, when the ray (represented by the ray data structure 440) intersects one or more primitives of the three-dimensional image, the ray intersection tester 412 may generate the spawned ray data structures 442 that represent spawned rays. Moving to 712, a second priority may be assigned to the plurality of spawned ray data structures based on the first priority. For example, in FIG. 4, the ray intersection tester 412 may assign the second priority 443 to the spawned ray data structures 442 based on the priority 441. Advancing to 714, a determination may be made whether any of the spawned rays intersects the one or more primitives by testing the spawned ray data structures and the primitive data structures of the spatial data structure. For example, in FIG. 4, the ray intersection tester 412 may determine whether any of the spawned rays (represented by the spawned ray data structures 442) intersect one or more primitives of the three-dimensional image. Proceeding to 716, the plurality of spawned ray data structures may be sent to the master processing element and the method ends. For example, in FIG. 4, the ray intersection tester 412 may send the spawned ray data structures 442 to the master processing element 402.

Thus, by assigning priorities to ray data structures that represent rays in a ray tracing system, the ray data structures may be processed by various processing elements (e.g., a master processing element, slave processing elements, pixel shader processing elements, and a ray intersection tester processing element) based on the priorities. For example, the processing elements may process ray data structures that have a higher priority before processing ray data structure s that have a lower priority. By using multiple processing elements to perform ray tracing operations, ray tracing of a three dimensional image may be performed substantially in parallel.

Program code used by embodiments of the disclosure may include heuristics. A heuristic algorithm may ignore whether a solution to a problem can be proven to be correct, but may produce a solution or solve a simpler problem that contains or intersects with a solution of a more complex problem. For example, a heuristic algorithm may process historical, real time, predicted or other performance data to determine that a particular object of interest is never intersected. In addition, heuristics may be used to determine the number of primitives per node based upon the distance of the primitive and/or bounding volume from the reference. Embodiments may utilize network-on-a-chip (NoC) technology. NoC-based systems may accommodate multiple asynchronous clocking used by many system-on-a-chip designs.

As discussed herein, certain embodiments consistent with the disclosure may include microprocessors to execute multiple processing elements in parallel, to provide many of the same performance gains attainable through the use of multiple microprocessors.

Embodiments may also include a number of computer software, firmware, and hardware technologies to facilitate additional parallel processing. For example, multi-processing element operating systems or multi-processing element kernels may permit computer programs to concurrently execute in multiple processing elements to concurrently perform multiple tasks, with each of the multiple processing elements representing independent paths of execution for a program.

In general, routines executed to implement the embodiments of the disclosure, whether implemented in hardware, firmware, in a software operating system, or as a specific application, component, program, engine, process, programmatic tool, object, module, or sequence of instructions, or even a subset thereof, may be referred to herein as an "algorithm," "function," "program code," or simply "program."

Program code may include one or more instructions that are resident at various times in various memory and storage devices in a computer, and that, when read and executed by one or more processors in a computer, cause that computer to perform actions to execute steps or elements of the various embodiments. Embodiments consistent with the principles of the present disclosure may use program code resident at one location or at more than one location.

The various embodiments may be distributed as a program product in a variety of forms, such as tangible, non-transitory, recordable type media, including volatile and non-volatile memory devices, removable disks, hard disk drives, magnetic tape, optical disks (e.g., CD ROMs, DVDs, etc.), among others.

In addition, various program code described hereinafter may be identified based upon the application or engine within which it is implemented in a specific embodiment. However, it should be appreciated that any particular program nomenclature that follows is used merely for convenience, and the various embodiments should not be limited to any specific application or engine identified and/or implied by such nomenclature.

Furthermore, given the variety of ways in which computer programs may be organized into routines, procedures, methods, modules, objects, and the like, as well as the various ways in which program functionality may be allocated among various software layers that are resident within a typical computer (e.g., operating systems, libraries, API's, applications, applets, etc.), it should be appreciated that the various embodiments are not limited to the specific organization and allocation of program functionality described herein.

The various software components and resources illustrated in this disclosure may be implemented in any number of ways, including various computer software applications, routines, components, programs, objects, modules, data structures and programs. The exemplary environments illustrated in this disclosure are not intended to limit the present disclosure. Indeed, those skilled in the art will recognize that other alternative hardware and/or software environments may be used without departing from the scope of this disclosure.

Furthermore, because computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that embodiments of the disclosure are not limited to the specific organization and allocation of program functionality described herein.

The descriptions of the various embodiments are provided to enable a person skilled in the art to make or use the embodiments. Various modifications to these embodiments may be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method, comprising:
assigning, by a master processing element, a priority to a ray data structure of a plurality of ray data structures based on a plurality of inputs received by the master processing element from a plurality of sources, the ray data structure comprising properties of a ray to be traced in a three-dimensional image, wherein the plurality of sources includes a software application and at least one other source;
identifying a portion of the three-dimensional image through which the ray passes;
identifying a slave processing element associated with the portion of the three-dimensional image, wherein the slave processing element is configured to determine whether the ray intersects a geometric primitive within the portion of the three-dimensional image; and
sending the ray data structure to the slave processing element, wherein the priority assigned to the ray data structure determines a ratio of refractive rays spawned by the ray data structure to reflective rays spawned by the ray data structure.

2. The method of claim 1, wherein inputs received from the software application include priority information based on motion properties of an object within the three-dimensional image.

3. The method of claim 1, further comprising receiving one or more spawned ray data structures from a ray intersection tester, the spawned ray data structures corresponding to rays spawned after the ray intersection tester determines that the ray intersects a surface in the three-dimensional image, the surface represented by one or more geometric primitives.

4. The method of claim 3, wherein the spawned ray data structures are assigned second priorities by the intersection tester based on the priority of the ray data structure received from the slave processing element.

5. The method of claim 4, further comprising:
identifying a second portion of the three-dimensional image that a particular spawned ray of the spawned rays passes through;
identifying a second slave processing element associated with the second portion of the three-dimensional image; and
sending to the second slave processing element a spawned ray data structure that corresponds to the particular spawned ray.

6. The method of claim 1, wherein the priority assigned to the ray data structure is used to determine a number of child ray data structures spawned by the ray data structure.

7. The method of claim 1, wherein the priority assigned to the ray data structure is used to determine a priority of the slave processing element to which the ray data structure is sent.

8. The method of claim 1, wherein the at least one other source includes a game controller, a device capable of detecting an eye movement of a user, or a combination thereof.

9. The method of claim 1, wherein the priority assigned to the ray data structure is based on a weighted average of the plurality of inputs received from the plurality of sources.

10. A computer program product comprising a computer storage device having computer usable program code embodied therewith, the computer usable program code executable by a processor to:
receive a ray data structure and a path to a leaf node representing a portion of a three-dimensional image from a slave processing element at a ray intersection tester, wherein the ray data structure comprises properties of a ray to be traced in the three-dimensional image, the properties of the ray including an associated first priority;
determine whether the ray intersects a surface in the three-dimensional image, the surface represented by one or more geometric primitives; and
when the ray intersects the surface, create a plurality of ray data structures corresponding to a plurality of rays, the plurality of rays spawned based on properties of the surface, wherein the first priority assigned to the ray data structure determines a ratio of refractive rays spawned by the ray data structure to reflective rays spawned by the ray data structure.

11. The computer program product of claim 10, wherein the computer usable program code is further executable by the processor to assign a second priority to the plurality of ray data structures based on the first priority.

12. The computer program product of claim 10, wherein the computer usable program code is further executable by the processor to send the plurality of ray data structures to a master processing element.

13. The computer program product of claim 10, wherein the computer usable program code is further executable by the processor to send the ray data structure to a background pixel shader when the ray does not intersect the surface in the three-dimensional image.

14. The computer program product of claim 10, wherein the computer usable program code is further executable by the processor to send the ray data structure to a foreground pixel shader when the ray intersects the surface in the three-dimensional image.

15. A system, comprising:
a master processing element to receive one or more priorities associated with a plurality of rays, to assign a priority to a ray data structure based on the one or more priorities, the ray data structure comprising properties of a ray from the plurality of rays that is to be traced in a three-dimensional image, to identify a portion of the three-dimensional image through which the ray passes, to identify a slave processing element associated with the portion of the three-dimensional image, and to send the ray data structure to the slave processing element; and the slave processing element, wherein the slave processing element is configured to determine whether the ray intersects a geometric primitive within the portion of the three-dimensional image, wherein the priority assigned to the ray data structure determines a ratio of refractive rays spawned by the ray data structure to reflective rays spawned by the ray data structure.

16. The system of claim 15, wherein the slave processing element is configured to receive the ray data structure, to traverse a spatial data structure that represents the three-dimensional image until a leaf node is reached, to send the ray data structure to a background pixel shader when the leaf node is empty, and to send the ray data structure to a ray intersection tester when the leaf node includes one or more primitive data structures.

17. The system of claim 16, wherein the ray intersection tester is configured to receive the ray data structure, to determine whether the ray intersects a surface in the three-dimensional image that correspond to the one or more primitive data structures of the leaf node, to send the ray data structure to the background pixel shader when the ray does not intersect the surface, to send the ray data structure to a foreground pixel shader when the ray intersects the surface, to spawn a second plurality of ray data structures corresponding to a second plurality of spawned rays when the ray intersects the surface, and to assign a second priority to the second plurality of ray data structures based on the priority of the ray data structure that spawned the second plurality of ray data structures.

18. The system of claim 17, wherein the ray intersection tester is further configured to determine whether any of the second plurality of rays intersects the surface.

19. The system of claim 17, wherein the ray intersection tester is further configured to send the second plurality of ray data structures to the master processing element.

20. The system of claim 15, wherein the master processing element is configured to receive the one or more priorities associated with the plurality of rays from at least a software program.

* * * * *